United States Patent
Schwarz et al.

(10) Patent No.: US 10,526,916 B2
(45) Date of Patent: Jan. 7, 2020

(54) HEAT EXCHANGER WITH HEAT RESISTANT CENTER BODY

(71) Applicant: UNITED TECHNOLOGIES CORPORATION, Farmington, CT (US)

(72) Inventors: Frederick M. Schwarz, Glastonbury, CT (US); Paul W. Duesler, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 733 days.

(21) Appl. No.: 15/138,727

(22) Filed: Apr. 26, 2016

(65) Prior Publication Data

US 2017/0306794 A1    Oct. 26, 2017

(51) Int. Cl.
| | | |
|---|---|---|
| F01D 17/10 | (2006.01) | |
| F01D 25/12 | (2006.01) | |
| F01D 25/24 | (2006.01) | |
| F02C 7/18 | (2006.01) | |
| F02K 3/115 | (2006.01) | |
| F02K 9/64 | (2006.01) | |
| F28D 1/047 | (2006.01) | |

(Continued)

(52) U.S. Cl.
CPC ............... *F01D 25/12* (2013.01); *F01D 5/02* (2013.01); *F01D 17/105* (2013.01); *F01D 25/24* (2013.01); *F04D 29/321* (2013.01); *F28D 1/0475* (2013.01); *F28F 9/001* (2013.01); *F28F 9/0075* (2013.01); *F28F 9/0131* (2013.01); *F28F 9/0273* (2013.01); *F28F 21/087* (2013.01); *F05D 2220/32* (2013.01); *F05D 2260/213* (2013.01)

(58) Field of Classification Search
CPC ........ F01D 17/105; F01D 25/12; F01D 25/24; F02C 7/185; F02K 3/115; F02K 9/64; F05D 2260/213; F28D 1/0475; F28D 7/1623; F28D 1/05308; F28D 1/05358; F28D 7/06; F28D 7/10; F28D 7/103; F28D 7/106; F28D 7/16; F28D 7/1615; F28F 9/001; F28F 9/0075; F28F 9/0131; F28F 9/0273
See application file for complete search history.

(56) References Cited

U.S. PATENT DOCUMENTS

| 3,811,960 A | 5/1974 | Parry et al. |
| 5,413,752 A | 5/1995 | Kissinger et al. |

(Continued)

FOREIGN PATENT DOCUMENTS

| EP | 2966395 A1 | 1/2016 |
| JP | S5486772 U | 6/1979 |

OTHER PUBLICATIONS

European Search Report for European Application No. 17168086.1 dated Sep. 21, 2017.

*Primary Examiner* — Woody A Lee, Jr.
*Assistant Examiner* — Christopher R Legendre
(74) *Attorney, Agent, or Firm* — Carlson, Gaskey & Olds, P.C.

(57) ABSTRACT

A heat exchanger for use in a gas turbine engine has a central body including an inlet manifold and at least one tube providing an outlet manifold, and a plurality of tubes communicating holes in an outer periphery of the inlet manifold to holes in an outer periphery of the outlet manifold, and passages for cooling air to pass across the tubes. A gas turbine engine is also disclosed.

11 Claims, 6 Drawing Sheets

(51) Int. Cl.
  *F28D 7/16*     (2006.01)
  *F28F 21/08*    (2006.01)
  *F28F 9/00*     (2006.01)
  *F28F 9/007*    (2006.01)
  *F28F 9/013*    (2006.01)
  *F28F 9/02*     (2006.01)
  *F04D 29/32*    (2006.01)
  *F01D 5/02*     (2006.01)

(56) References Cited

U.S. PATENT DOCUMENTS

| | | | |
|---|---|---|---|
| 6,902,633 B2 * | 6/2005 | King | C22C 19/056 |
| | | | 148/428 |
| 8,127,829 B2 | 3/2012 | Sabatino et al. | |
| 8,307,662 B2 * | 11/2012 | Turco | F01D 5/081 |
| | | | 60/782 |
| 8,776,869 B2 | 7/2014 | Barnes et al. | |
| 9,243,850 B1 | 1/2016 | Bastian et al. | |
| 2001/0015059 A1 * | 8/2001 | Fetescu | F01K 21/047 |
| | | | 60/772 |
| 2009/0218086 A1 | 9/2009 | Sciorelli | |
| 2011/0088405 A1 | 4/2011 | Turco | |
| 2013/0145744 A1 * | 6/2013 | Lo | F01D 17/105 |
| | | | 60/226.3 |
| 2017/0044983 A1 * | 2/2017 | Duesler | F02C 7/185 |
| 2017/0306794 A1 * | 10/2017 | Schwarz | F01D 25/12 |

\* cited by examiner

HEAT EXCHANGER WITH HEAT RESISTANT CENTER BODY

STATEMENT REGARDING FEDERALLY SPONSORED RESEARCH OR DEVELOPMENT

This invention was made with government support under Contract No. FA8650-09-D-2923-AETD awarded by the United States Air Force. The Government has certain rights in this invention.

BACKGROUND

This application relates to a heat exchanger for providing cooling air in a gas turbine engine.

Gas turbine engines are known and typically include a fan delivering air into a bypass duct as propulsion air, and further providing air into a core housing. Air in the core housing passes into a compressor where it is compressed, and then into a combustor where it is mixed with fuel and ignited. Products of this combustion pass downstream over turbine rotors, driving them to rotate.

As is known, the turbine rotor components see very high temperatures and thus cooling air has been typically provided to those components. Historically, the fan and a low pressure compressor have rotated as a single unit along with a fan drive turbine. However, more recently, a gear reduction has been placed between the fan rotor and the fan drive turbine. This allows the fan rotor to rotate at slower speeds and the fan drive turbine to rotate at faster speeds. This raises the challenges on the turbine components and requires more efficient provision of the cooling air.

At the same time, the overall pressure ratio provided by the compressor has increased. Historically, the air to cool the turbine components has been tapped from a location downstream of a highest pressure location on the compressor. However, with the increase in overall pressure ratio, this air has become hotter.

The heat exchangers for cooling this air are thus subject to extreme challenges.

SUMMARY

In a featured embodiment, a heat exchanger for use in a gas turbine engine has a central body including an inlet manifold and at least one tube providing an outlet manifold, and a plurality of tubes communicating holes in an outer periphery of the inlet manifold to holes in an outer periphery of the outlet manifold, and passages for cooling air to pass across the tubes.

In another embodiment according to the previous embodiment, the central body is cast with the holes formed in the inlet and outlet manifolds.

In another embodiment according to any of the previous embodiments, the inlet manifold is positioned centrally between at least a pair of the outlet manifolds.

In another embodiment according to any of the previous embodiments, the central body is formed of a super alloy nickel material including at least 50 percent by weight of gamma-prime.

In another embodiment according to any of the previous embodiments, the tubes pass through plates on opposed sides of the central body.

In another embodiment according to any of the previous embodiments, the plates are also cast with holes and the tubes connect through a series of the plates, and between the manifolds.

In another embodiment according to any of the previous embodiments, air to be cooled is supplied into the inlet manifold at one end, and passes from the outlet manifold at another end.

In another embodiment according to any of the previous embodiments, air to be cooled passes into the input inlet at opposed ends, and passes from the outlet manifold at opposed ends.

In another featured embodiment, a gas turbine engine comprises a compressor and a turbine section, a tap for tapping air that has been compressed by the compressor and passing the air through a heat exchanger, and then returning cooled air to cool the turbine section. The heat exchanger includes a central body including an inlet manifold and at least one outlet manifold, and a plurality of tubes communicating holes in an outer periphery of the inlet manifold to holes in an outer periphery of the outlet manifold, and passages for cooling air to pass across the tubes.

In another embodiment according to the previous embodiment, the central body is cast with the holes formed in the inlet and outlet manifolds.

In another embodiment according to any of the previous embodiments, the inlet manifold is positioned centrally between at least a pair of the outlet manifolds.

In another embodiment according to any of the previous embodiments, the central body is formed of a super alloy nickel material including at least 50 percent by weight of gamma-prime.

In another embodiment according to any of the previous embodiments, the tubes pass through plates on opposed sides of the central body.

In another embodiment according to any of the previous embodiments, the plates are also cast with holes and the tubes connect through a series of the plates, and between the manifolds.

In another embodiment according to any of the previous embodiments, air to be cooled is supplied into the inlet manifold at one end, and passes from the outlet manifold at another end.

In another embodiment according to any of the previous embodiments, air to be cooled passes into the inlet manifold at opposed ends, and passes from the outlet manifold at opposed ends.

In another embodiment according to any of the previous embodiments, the heat exchanger is positioned within a core engine housing.

In another embodiment according to any of the previous embodiments, the cooling air is bypass air from a bypass duct.

In another embodiment according to any of the previous embodiments, a control controls the flow of bypass air into the core housing and across the heat exchanger.

In another embodiment according to any of the previous embodiments, a valve controls the flow of the compressed air into the heat exchanger and a control controls the valve to selectively pass the compressed air through the heat exchanger.

These and other features may be best understood from the following drawings and specification.

These and other features may be best understood from the following drawings and specification.

DETAILED DESCRIPTION

Figure 1:
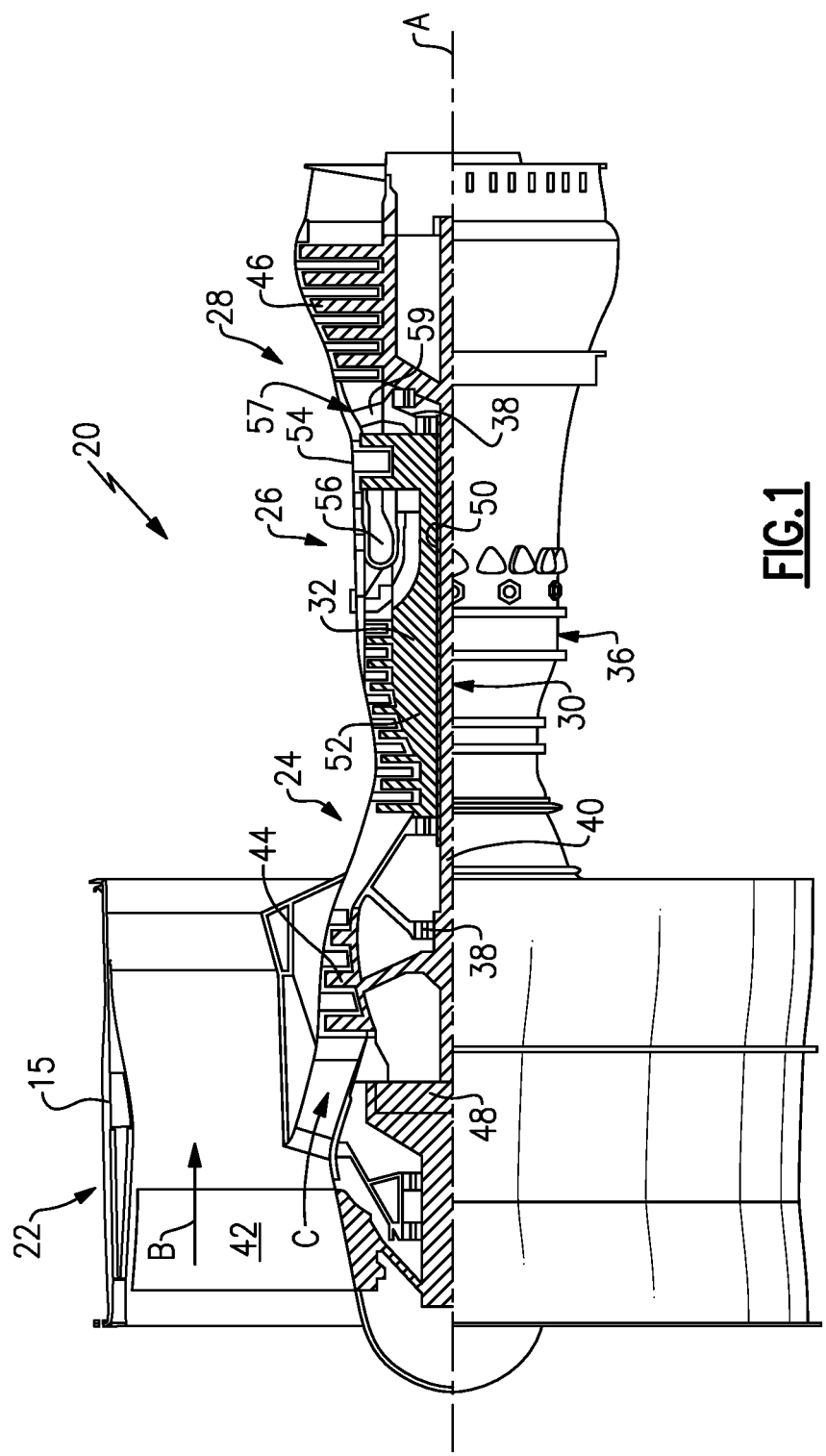
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
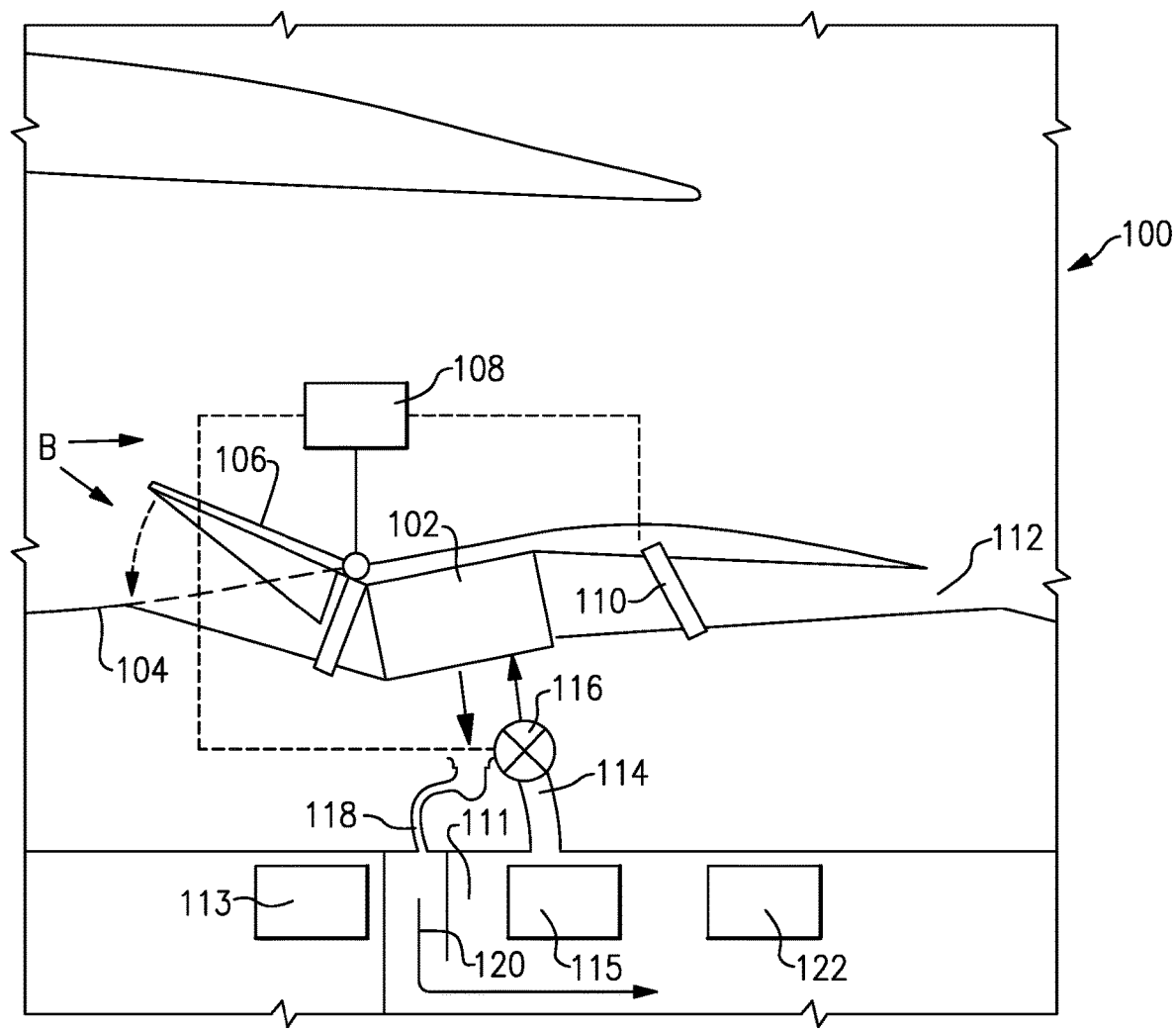
FIG. 2 shows one example location for a heat exchanger.

FIG. 2 shows a cooling system 100 including a heat exchanger 102. A core housing 104 receives the heat exchanger 102, and has a selectively opened door or valve 106, controlled by a control 108, to divert bypass air B across the heat exchanger 102 for cooling air in the heat exchanger. A downstream duct 110 may also be controlled by control 108. In this manner, the bypass air B may be selectively brought across the heat exchanger 102 or blocked under lower power conditions when cooling is not needed. An exhaust 112 passes outwardly of the core housing 104 downstream of the duct 110.

A tap 114 taps heated air from a chamber 111 which is downstream of a high pressure compressor 113. While the tap 114 is shown radially outward of a combustor 115, other locations within the chamber 111 may be utilized.

The air from tap 114 passes through a valve 116 and to the heat exchanger 102. The valve 116 is shown under the control of control 108. Notably, control 108 could be a standalone control or could be incorporated into an overall control for the engine, such as a FADEC.

The air from tap 114 is cooled in heat exchanger 102 and returned through a return line 118, and through a strut 120, to flow downstream to cool the turbine 122.

As mentioned above, modern engines are seeing higher temperatures downstream of the compressor 113 for a number of reasons. Thus, it becomes more important to cool the compressed air prior to its use as cooling air for turbine components. However, the turbine is also seeing higher pressure and thus it is important that the cooling air also be at a high pressure such that it can perform its cooling function. Thus, air from cooler, lower pressure locations in the compressor cannot be used without the pressure thereof being increased.

Typical heat exchangers, as utilized in gas turbine engines, may not be well suited for such high temperatures.

Figure 3A:
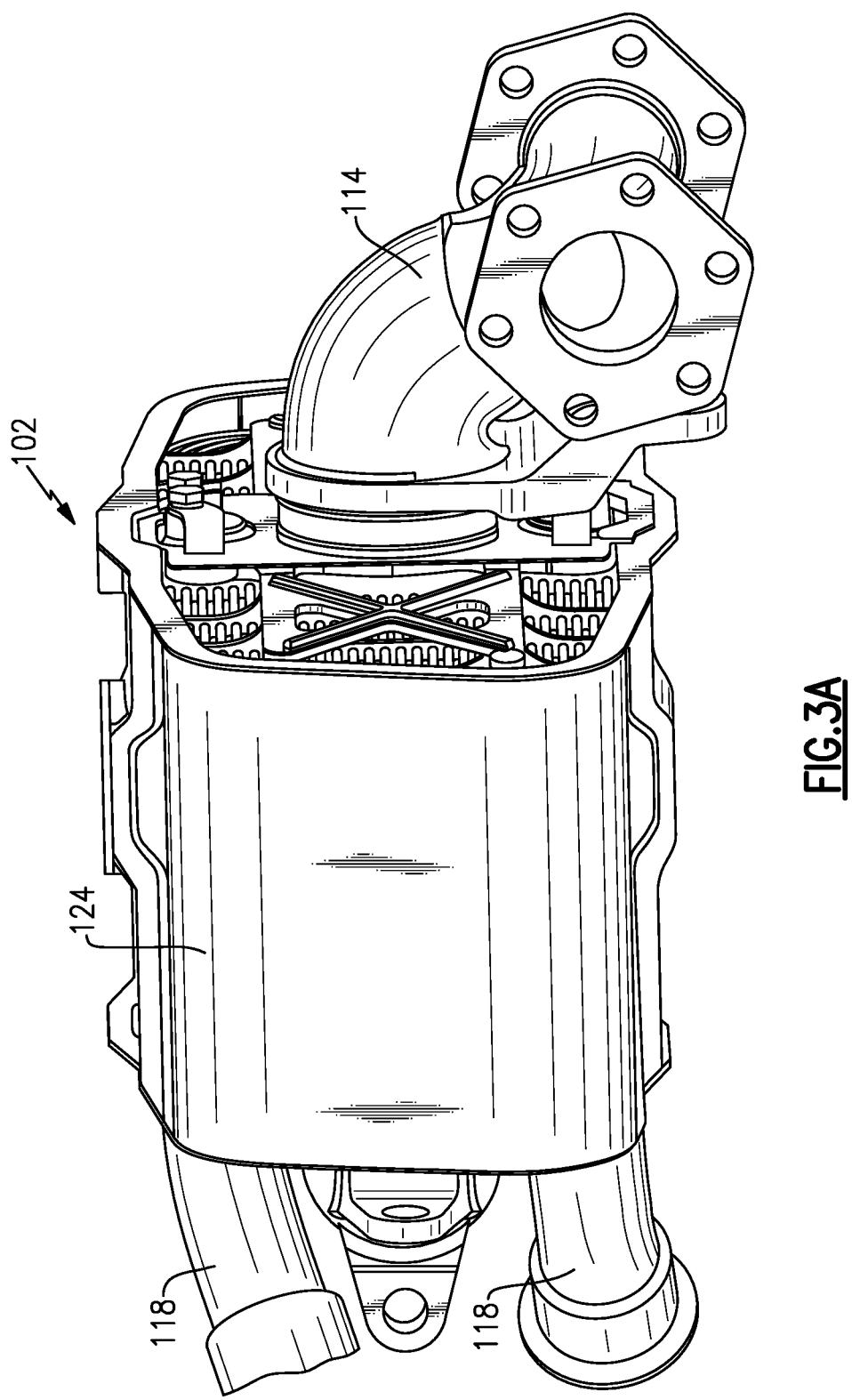
FIG. 3A shows a first view of a heat exchanger.

FIG. 3A shows an example heat exchanger 102. The tap 114 is shown leading into a central manifold and the taps or return lines 118 are shown as two spaced taps leading from locations spaced laterally of the central manifold. An outer housing 124 surrounds these structures.

Figure 3C:
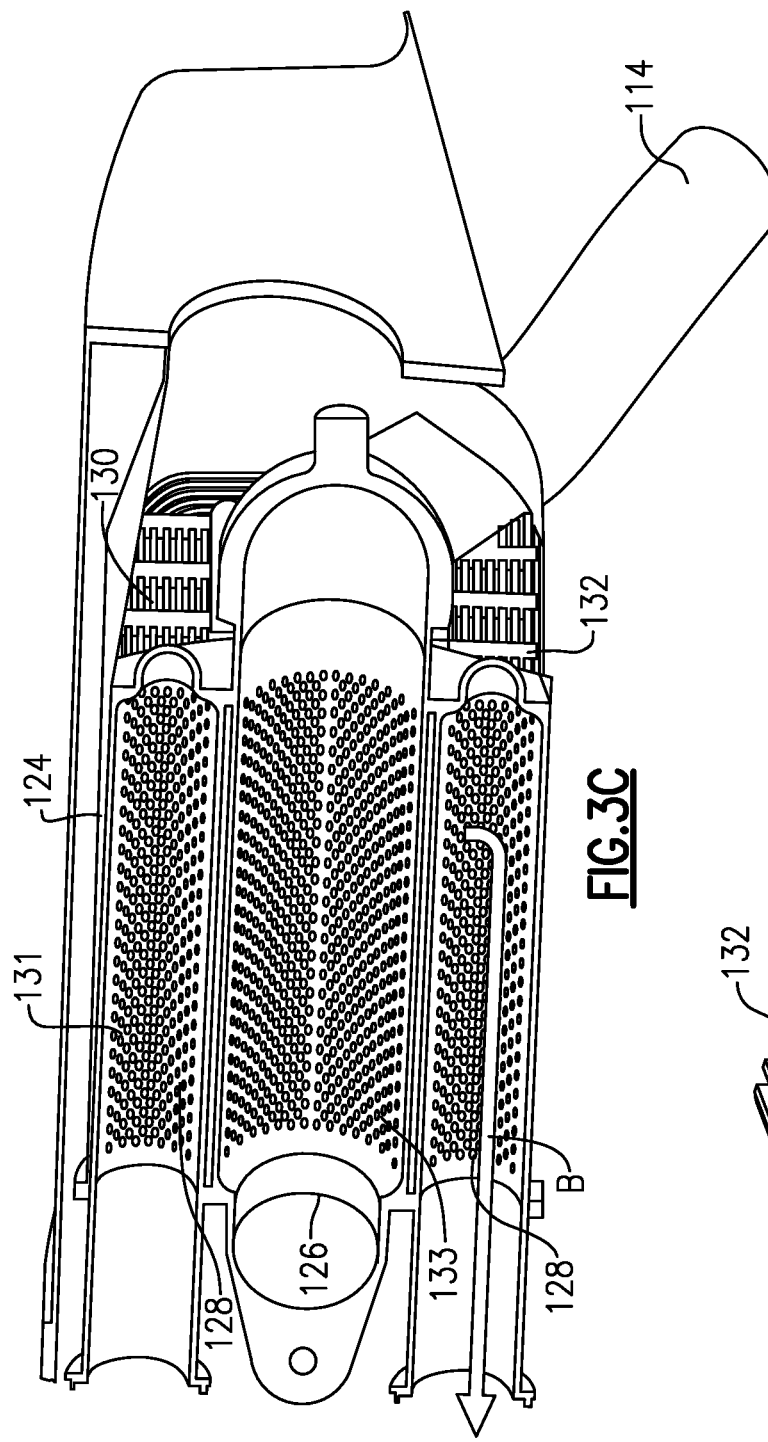
FIG. 3C is a cross-section through the heat exchanger.
Figure 3B:
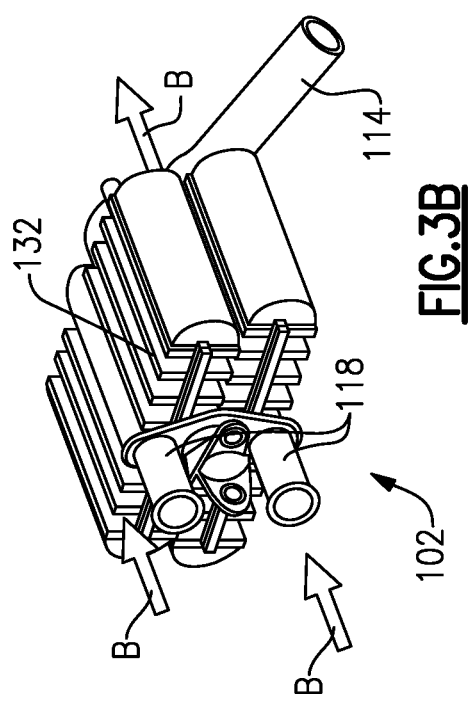
FIG. 3B shows details of the heat exchanger.

FIG. 3B shows the basic flow structure through the heat exchanger 102. The tap 114 comes into the central manifold, flows laterally outwardly, as will be explained in greater detail below, through tubes in a plurality of spaced plates 132, then returns to the laterally outer manifolds, and the outlet lines leading to the return line 118. Bypass air B passes across the tubes, cooling the air.

As shown in FIG. 3C, the central manifold 126 is laterally inward of the return or outer manifolds 128. There are holes 133 formed in the central manifold 126 and holes 131 formed in the outer manifolds 128. In addition, tubes 130 are shown extending through the plates 132.

Figure 4:
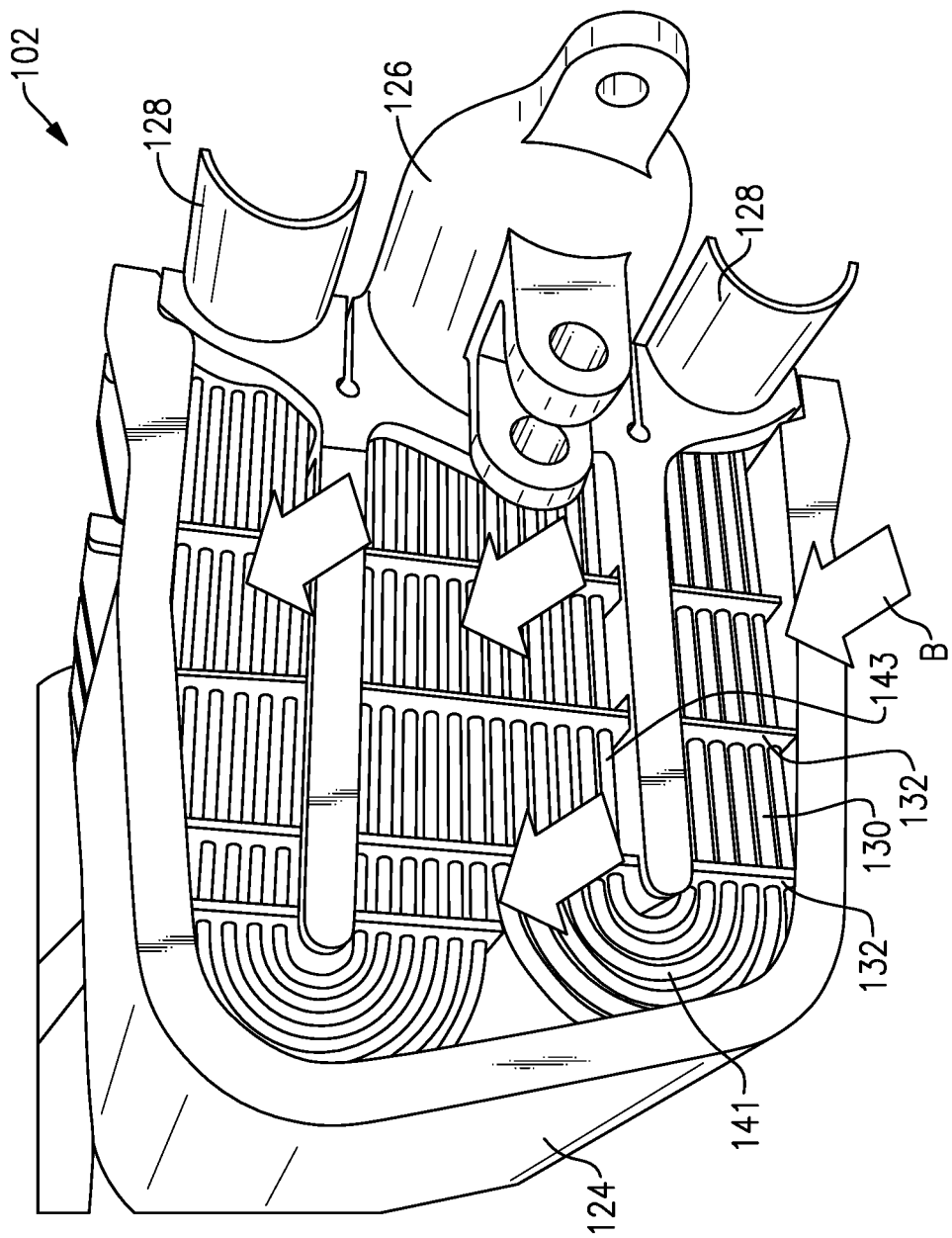
FIG. 4 is a perspective view of the heat exchanger.

As shown in FIG. 4, and as can be appreciated from consideration of each of the earlier figures, air to be cooled comes into the heat exchanger 102 through the central manifold 126 and passes outwardly through the holes 133 into tubes 130. Tubes 130 extend to both sides of the central manifold 126, and through the plates 132. An elbow 141 of the tubes returns into another tube portion 143 back toward the outer or output manifolds 128. This air then passes into the outer manifolds 128 through the holes 131. Bypass air B passes across the tubes.

Figure 5:
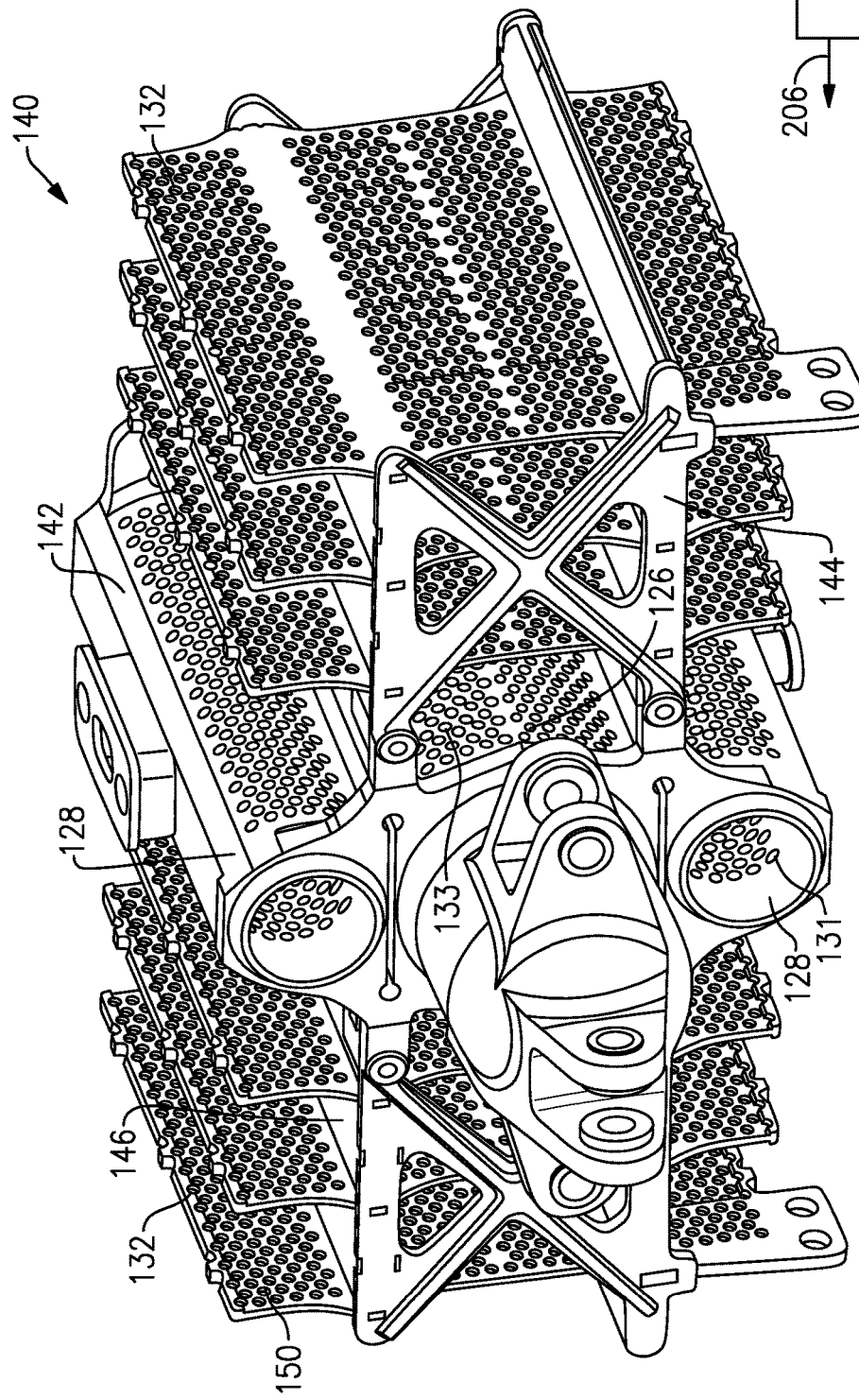
FIG. 5 shows internal components of the heat exchanger.

FIG. 5 shows internal details, including a monolithic central body member 142, which is cast from a material which is suited to withstand very high temperatures. In embodiments, a super alloy may be utilized. Such alloys may be typically utilized to form turbine components.

The super alloy could be defined as a nickel alloy having 50-percent by weight of gamma-prime (Y'). Intermetallic phase material may be utilized as the Y' material. The intermetallic phase material may be $Ni_3AL$ or $Ni_3TI$ as examples.

The use of this material, which has been typically reserved for use in the turbine, allows the heat exchanger to survive much higher temperatures than with typical heat exchangers utilized in gas turbine engines. As such, the challenges mentioned above can be addressed.

The central body is cast and can be cast with the holes 133 and 131. This is an improvement over the prior art, wherein the holes had to be machined into the heat exchanger body. Extending members 144 extend away from the central body 142, but are cast with the central body and serve as supports for the plates 132. Brackets 146 are also mounted on the extending member 144 and the plates 132. The components which have all been cast separately may be brazed together.

The plates 132 may also be cast of a super alloy material and can be formed with their internal holes 150.

After this component is assembled, the tubes extend from the holes 133 in the central manifold 126, through the holes 150 in the plates 132, and then back through the holes 150 in the plates 132 and into both of the outer manifolds 128 by passing through the holes 131. As the air to be cooled passes along this path, the cooling air B cools the air within the tubes.

By forming the central body as a cast member including the inlet manifold and the outlet manifold, it is better suited to withstand the high temperatures. Further, the use of the super alloy material also provides a heat exchanger which is best suited for meeting the higher temperatures.

Figure 6:
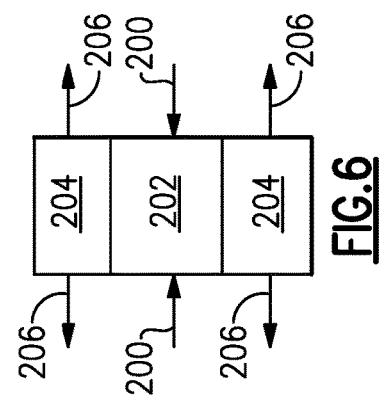
FIG. 6 shows another embodiment.

FIG. 6 shows an embodiment schematically where inlet lines 200 extend into the central manifold 202 from both sides. This may reduce Mach numbers within the central manifold and reduce standing vortex concerns.

In FIG. 6, the outlet or outer manifolds 204 are also shown to have output or return lines 206 extending from both ends.

The center module may include a honeycomb flow straightener to also reduce any vortex strength. Also, the center module may include a center body flow guide also to reduce vortex strength.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A heat exchanger for use in a gas turbine engine comprising:
    a central body including an inlet manifold and at least two outlet manifolds, and a plurality of tubes communicating holes in an outer periphery of said inlet manifold to holes in an outer periphery of said at least two outlet manifolds;
    passages for cooling air to pass across said tubes;
    wherein said inlet manifold is positioned centrally between said at least two outlet manifolds;
    wherein said central body is formed of a super alloy nickel material including at least 50 percent by weight of gamma-prime;
    wherein said tubes each pass through a plurality of plates on opposed sides of said central body and said tubes passing in opposed lateral directions away from said inlet manifold to an elbow, and then returning back in an opposed direction to communicate with said at least two outlet manifolds; and
    wherein said heat exchanger extending between two ends, air to be cooled passes into said inlet manifold at both said ends, and passes from said at least two outlet manifolds at both said ends.

2. The heat exchanger as set forth in claim 1, wherein said central body is cast with said holes formed in said inlet and outlet manifolds.

3. The heat exchanger as set forth in claim 1, wherein said plates are cast with holes and said tubes connect through a series of said plates, and between said inlet manifold and said at least two outlet manifolds.

4. A gas turbine engine comprising:
    a compressor and a turbine section, a tap for tapping air that has been compressed by said compressor and passing said air through a heat exchanger, and then returning cooled air to cool said turbine section;
    the heat exchanger including a central body including an inlet manifold and at least two outlet manifolds, and a plurality of tubes communicating holes in an outer periphery of said inlet manifold to holes in an outer periphery of said at least two outlet manifolds;
    passages for cooling air to pass across said tubes;

wherein said inlet manifold is positioned centrally between said at least two outlet manifolds; and wherein said tubes each pass through a plurality of plates on opposed sides of said central body and said tubes passing in opposed lateral directions away from said inlet manifold to an elbow, and then returning back in an opposed direction to communicate with said at least two outlet manifolds; and wherein said heat exchanger extending between two ends, air to be cooled passes into said inlet manifold at both said ends, and passes from said at least two outlet manifolds at both said ends.

5. The gas turbine engine as set forth in claim 4 wherein said central body is cast with said holes formed in said inlet and outlet manifolds.

6. The gas turbine engine as set forth in claim 4, wherein said central body is formed of a super alloy nickel material including at least 50 percent by weight of gamma-prime.

7. The gas turbine engine as set forth in claim 4, wherein said plates are cast with holes and said tubes connect through a series of said plates, and between said inlet and said at least two outlet manifolds.

8. The gas turbine engine as set forth in claim 4, wherein said heat exchanger is positioned within a core engine housing.

9. The gas turbine engine as set forth in claim 8, wherein the cooling air is bypass air from a bypass duct.

10. The gas turbine engine as set forth in claim 9, wherein a control controls the flow of bypass air into the core housing and across said heat exchanger.

11. The gas turbine engine as set forth in claim 4, wherein a valve controls the flow of said compressed air into said heat exchanger and a control controls said valve to selectively pass the compressed air through said heat exchanger.

* * * * *